July 16, 1940.   H. S. BURNHAM   2,208,322

LOCOMOTIVE CROSS HEAD STRUCTURE

Filed June 22, 1938   2 Sheets-Sheet 1

INVENTOR
Harry S. Burnham
BY S. C. Yeaton
ATTORNEY

Patented July 16, 1940

2,208,322

UNITED STATES PATENT OFFICE 2,208,322

LOCOMOTIVE CROSS HEAD STRUCTURE

Harry S. Burnham, Schenectady, N. Y., assignor to American Locomotive Company, New York, N. Y., a corporation of New York Application June 22, 1938, Serial No. 215,173

3 Claims. (Cl. 308—3)

This invention relates to locomotive cross head structures and has for an object the devising of a rigid composite frame independent of the main rod and piston rod and serving as the cross head and wrist pin for the rods.

Other objects of and advantages achieved by this invention will be apparent from the following description thereof and the claims appended hereto.

Figure 2:
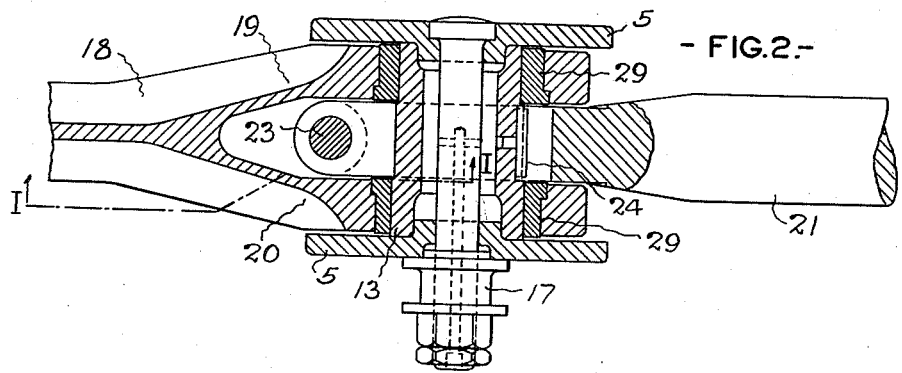
Figure 1:
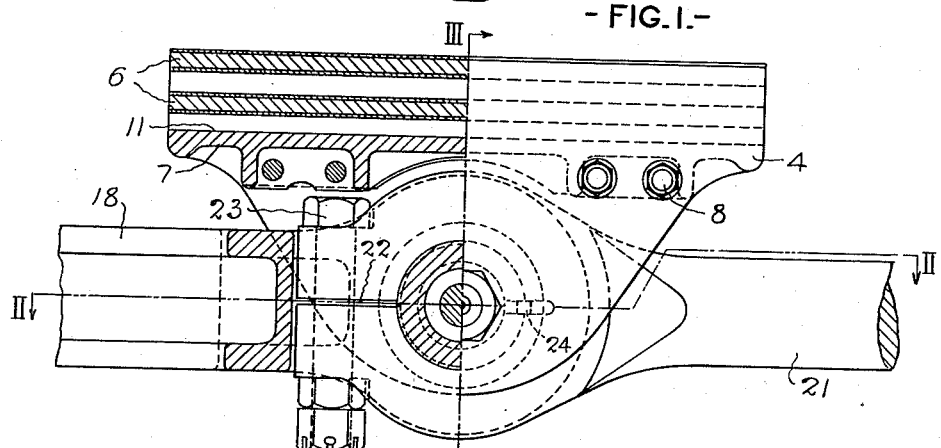
Figures 3, 4, 5:
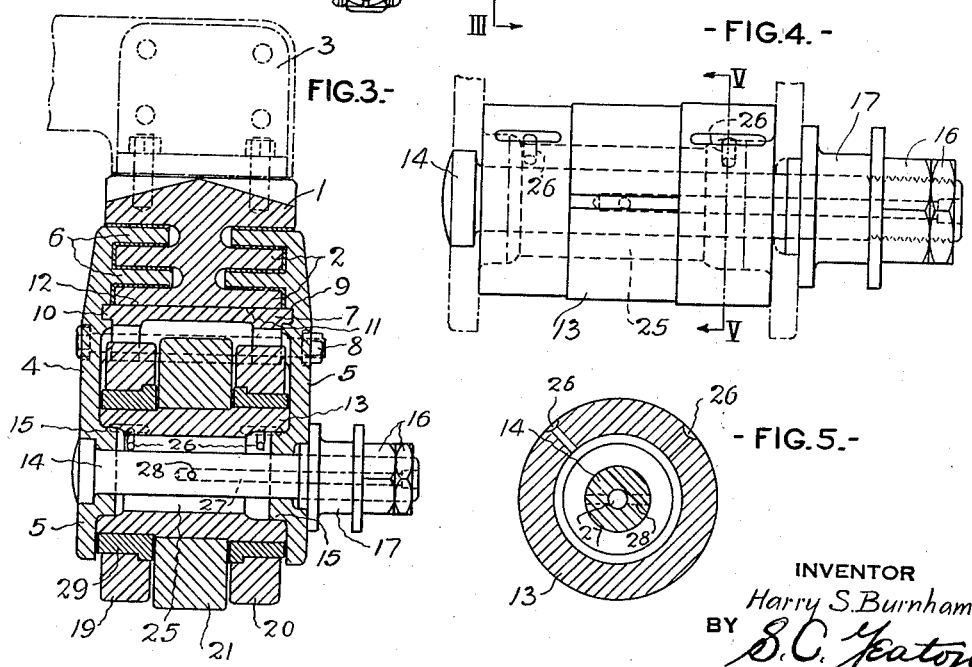
Figure 6:
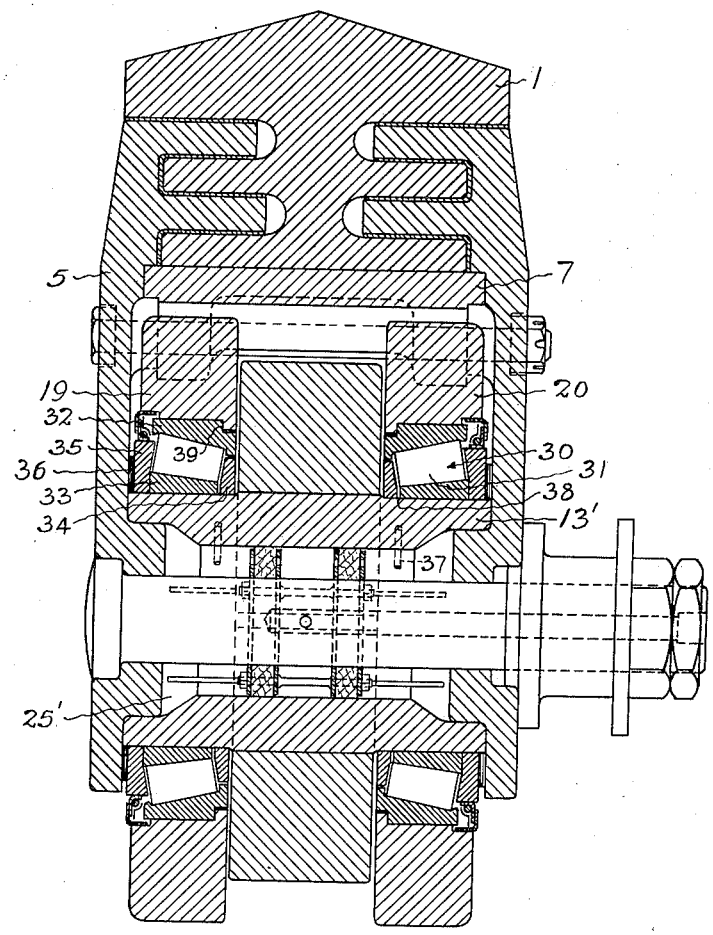

The invention is illustrated in the accompanying drawings wherein Figure 1, at the right, is a side elevation, and at the left a section on the line I—I of Fig. 2, of a locomotive cross head structure embodying the present invention, the cross head guide not being shown and the piston rod and main rod being shown fragmentally; Fig. 2 is a section on the line II—II of Fig. 1, parts being shown in full; Fig. 3 is a section on the line III—III of Fig. 1, parts being shown in elevation, the guide being shown in section and the guide bracket being shown in dot and dash lines; Fig. 4 is an enlarged elevation of the wrist pin and certain parts associated therewith, parts of the cross head being shown in dot and dash lines; Fig. 5 is a section on the line V—V of Fig. 4; and Fig. 6 is a section, similar to Fig. 3, enlarged, and showing frictionless bearing means.

Referring to the invention as shown in Figs. 1 to 5, a cross head guide 1, provided at each side with a plurality of ways 2, is bolted to a bracket 3, which in practice is secured at the side of the locomotive frame.

The cross head 4 of the structure comprises two separate plates 5, each provided with flanges 6 slidably engaging the ways 2, the wearing faces of the flanges being faced with lining metal in the usual manner; the spacer block 7 engaging the plates at parts thereof adjacent the guide; and bolts 8 passed through the plates and spacer block holding them rigidly together. The plates are provided with grooves 9 and the block with tongues 10 fitting within the grooves and the upper face 11 of the block slidably engages the lower face 12 of the guide, thereby providing a very rigid joint between the block and plates.

The structure further comprises means which engages the plates 5 at parts thereof spaced from the parts of engagement by the block 7, and comprises a wrist pin 13 and a bolt 14 passed through the plates and pin holding them rigidly together.

This combination of plates, block, pin and securing bolts provides a rigid composite frame which it will be noted is entirely free and independent, from a structural standpoint, of the main and piston rods.

The plates 5 are provided with bosses 15 upon which the pin 13 is mounted, thereby providing a strong support for the pin, and providing a very rigid joint between the pin and plates.

The bolt 14 is extended beyond the outer plate 5 and has mounted thereon, between this plate and the nuts 16, a collar 17 which provides a bearing for the combination link of the valve gear (not shown).

The main rod 18 of the structure is forked at its front end providing branches 19, 20, and a piston rod 21 is disposed at its rear end between the branches. The rods are orificed for mounting them upon the pin 13, the pin outer face being stepped, as are also the orifices (considered collectively), according to usual practice.

The rods are assembled together and the pin is inserted through the orifices in an obvious manner. The guide 1 being in place, the plates 5 are then assembled with the pin 13, block 7, and guide 1, and the bolts 8 and 14 are then inserted in place and the nuts thereof screwed tight, the collar 17 being first mounted on the bolt 14. The spacing by the block 7 and pin 13 is sufficient in extent to provide a sliding working fit between the cross head and guide. A very rigid frame is provided, forming a strong support for the rods, which are mounted on the wrist pin, entirely free from the plates.

In the present embodiment the piston rod 21 is slit, as shown at 22, and the portions thus formed are bolted together at the rear of the pin by a bolt 23 passed through orifices in these portions thus clasping the piston rod tightly upon the pin. The wrist pin is further secured from turning in the piston rod by a key 24 of well-known construction, this key being disposed in keyways formed in the pin and piston rod, forward of the pin. Instead of splitting the end of the piston rod it may be made solid and the wrist pin may be pressed within the orifice thereof after the piston rod and main rod jaws are placed in line, the key 24 being applied as before.

The pin is hollow to provide a chamber 25 for containing lubricant, preferably grease, and has passageways 26 through which the grease may pass to the bushings and pin engaging faces thereof. The bolt 14 is provided with an axial bore 27 open at its outer end and connected to the chamber 25 by a radial bore 28 providing means for filling the chamber with lubricant. The outer end of the bore 27 will usually be provided with a closure, such for instance as an Alemite fitting (not shown). The orifices in the branches 19 and 20 of the main rod are provided with bushings 29.

Referring to Fig. 6, the bushings 29 are here replaced by frictionless bearings 30. Obviously, if desired, the piston rod may be forked instead of the main rod, and the main rod forward end disposed between the branches of the fork, in which case the main rod will require but one bushing or frictionless bearing as the case may be.

Any suitable type of frictionless bearing may be employed. In the present instance a bearing of the conical roller type is shown more or less diagrammatically and comprises conical rollers 31 having their axes inclined inwardly toward the axis of the pin, an outer raceway 32, an inner raceway 33, and inner and outer end discs or plates 34 and 35. Between each outer end disc 35 and the adjacent cross head plate, disc-shaped shims 36 are disposed to provide for proper adjustment of the frictionless bearings when the arrangement is assembled, and as the bearing becomes worn and adjustment is made in view thereof, one or more shims will be added.

The pin 13' is provided with passageways 37 leading from the chamber 25' to openings 38 provided between the inner raceway 33 and the inner end disc 34 for lubricating the raceways and rollers.

The outer raceways 32 are prevented from moving inwardly by the shoulders 39. It will be noted that the face of the pin 13' is not of the stepped type of the pin 13. In the structure of Fig. 6, after the pin and rods have been assembled, the frictionless bearings are assembled and finally the plates and bolts.

Except as already described the cross head structure of Fig. 6 is similar to that of Figs. 1 to 5.

The preferred embodiment of the cross head structure of the present invention has the advantages that there is a direct connection between the piston rod and main rod through the wrist pin; that there is provision for a self-alignment of the cross head with the guide before the wrist pin is drawn solidly home; and that there is a relatively low reciprocating weight. In these points of advantage the present invention is similar to that covered by applicant's copending application Serial No. 210,791 (Patent No. 2,195,376, issued March 26, 1940).

A further feature of the present invention is the simplified guide which is formed in one piece having a central web and laterally extending flanges providing therebetween ways for the flanges of the cross head, which is the reverse of usual practice. The guide being made in one piece is simpler to manufacture than the usual two-piece guide. Furthermore on account of the ways being directed outwardly the guide is cheaper to manufacture than the usual one-piece guide where the ways are directed inwardly. This one-piece type of guide also permits the cross head plates to be removed for relining without disturbing the wrist-pin-rod assemblage.

While there have been hereinbefore described a preferred embodiment of this invention and a modification thereof, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A locomotive cross head structure comprising a piston rod; a main rod, said rods having adjacent ends, each provided with an orifice for mounting them upon a wrist pin, one of said rods at its said adjacent end being forked and the other of said rods having its said adjacent end disposed between the branches of said fork; a guide; a cross head having means slidably engaging said guide and separate spaced side plates extending from and carried by said means, said plates being separable from each other independently of said rods, a spacer block disposed between said plates, and bolts rigidly securing said spacer block and plates together, thereby holding said plates in fixed spaced relation at parts thereof disposed in the proximity of said guide; a wrist pin upon which said adjacent ends of said rods are mounted, said wrist pin holding said plates apart in fixed spaced relation at parts thereof spaced from said first mentioned parts; and a bolt extending through said plates and said wrist pin, rigidly securing said wrist pin and plates together.

2. A locomotive cross head structure comprising a guide for a cross head, said guide having horizontal spaced flanges providing oppositely disposed guide ways; a cross head having a pair of transversely spaced longitudinally extending separable side plates, the upper end portions of which have horizontal flanges disposed in said ways in sliding engagement with said guide flanges, whereby said cross head is carried by said guide flanges, and the lower ends of which suspend free; means holding said upper end portions in fixed spaced relation; a wrist pin disposed between said plates holding said lower ends against movement toward each other, said wrist pin having faces abutting each of said plates; means holding said lower ends against movement away from each other; and means providing an interfit between said wrist pin and each of said plates whereby said wrist pin is supportedly carried by said plates.

3. The combination of a locomotive cross head comprising two spaced outer plates, means spanning said plates and securing them rigidly together in their spaced relation, and a wrist pin spanning said plates within the space therebetween and carried thereby; a main rod; a piston rod, each of said rods being mounted upon said wrist pin within the space between said plates; and a cross head guide having a central vertical rib within said space between said plates, said rib having at each side thereof spaced flanges projecting therefrom toward the adjacent plate and each plate having spaced flanges projecting from its inner face toward the adjacent rib side and interfitting with the flanges thereof in sliding relation therewith.

HARRY S. BURNHAM.